United States Patent [19]

Morikawa et al.

[11] Patent Number: 5,543,854
[45] Date of Patent: Aug. 6, 1996

[54] VIDEO SIGNAL PROCESSING APPARATUS, VIDEO SIGNAL PROCESSING METHOD, AND VIDEO SIGNAL RECORDING/REPRODUCTION APPARATUS

[75] Inventors: Yasuhiro Morikawa, Amagasaki; Tomonori Ohashi; Masafumi Kodama, both of Nagaokakyo, all of Japan

[73] Assignee: Mitsubishi Denki Kabushiki Kaisha, Tokyo, Japan

[21] Appl. No.: 355,160

[22] Filed: Dec. 8, 1994

[30] Foreign Application Priority Data

Dec. 10, 1993 [JP] Japan .................................. 5-310464

[51] Int. Cl.$^6$ .................................. H04N 9/475
[52] U.S. Cl. .................................. 348/512; 348/497
[58] Field of Search .................. 348/536, 537, 348/538, 540, 541, 542, 543, 544, 547, 497–498, 714–719, 510, 501, 500, 512–514, 516, 518; H04N 5/04, 5/5, 7/08, 9/475

[56] References Cited

U.S. PATENT DOCUMENTS

| | | | |
|---|---|---|---|
| 4,296,436 | 10/1981 | Achiha | 348/700 |
| 4,306,250 | 12/1981 | Summers et al. | 348/516 |
| 4,438,456 | 3/1984 | Yoshinaka . | |
| 4,461,999 | 7/1984 | Wolf et al. | 348/536 |
| 4,488,170 | 12/1984 | Nillesen | 348/540 |
| 5,146,336 | 9/1992 | Tessier et al. | 348/501 |
| 5,281,926 | 1/1994 | Rabii | 348/536 |
| 5,331,347 | 7/1994 | Wu | 348/536 |

FOREIGN PATENT DOCUMENTS 0479135  4/1992  European Pat. Off. .

*Primary Examiner*—Safet Metjahic
*Assistant Examiner*—Michael H. Lee

[57] ABSTRACT

A video signal processing apparatus, video signal recording/reproduction apparatus, and method therefor, perform arithmetic operations upon an input video signal and the input signal delayed by a predetermined amount of time. A memory stores the input signal for the predetermined amount of time in order to produce the delayed input video signal. A controller controls the memory to store the input video signal for the predetermined amount of time based on a main synchronization signal. A first synchronization signal is produced by separating a synchronizing signal from the input video signal. A second synchronization signal is generated based on the first synchronization signal. During operation, a switching unit supplies the first synchronization signal to the controller as the main synchronization signal until the second synchronization signal becomes synchronized with the first synchronization signal. Once the second synchronization signal becomes synchronized with the first synchronization signal, the switching unit supplies the second synchronization signal to the controller as the main synchronization signal. In this manner, jitter caused by noise or distortion in the first synchronization signal separated from the input video signal is eliminated by the switching to the second synchronization signal. The second synchronizing signal is not affected by noise or waveform distortion; and consequently, arithmetic operations in the correct time axis are performed.

30 Claims, 12 Drawing Sheets

FIG. 5
PRIOR ART
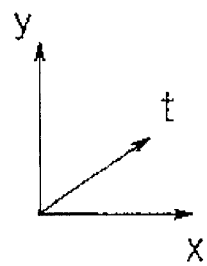
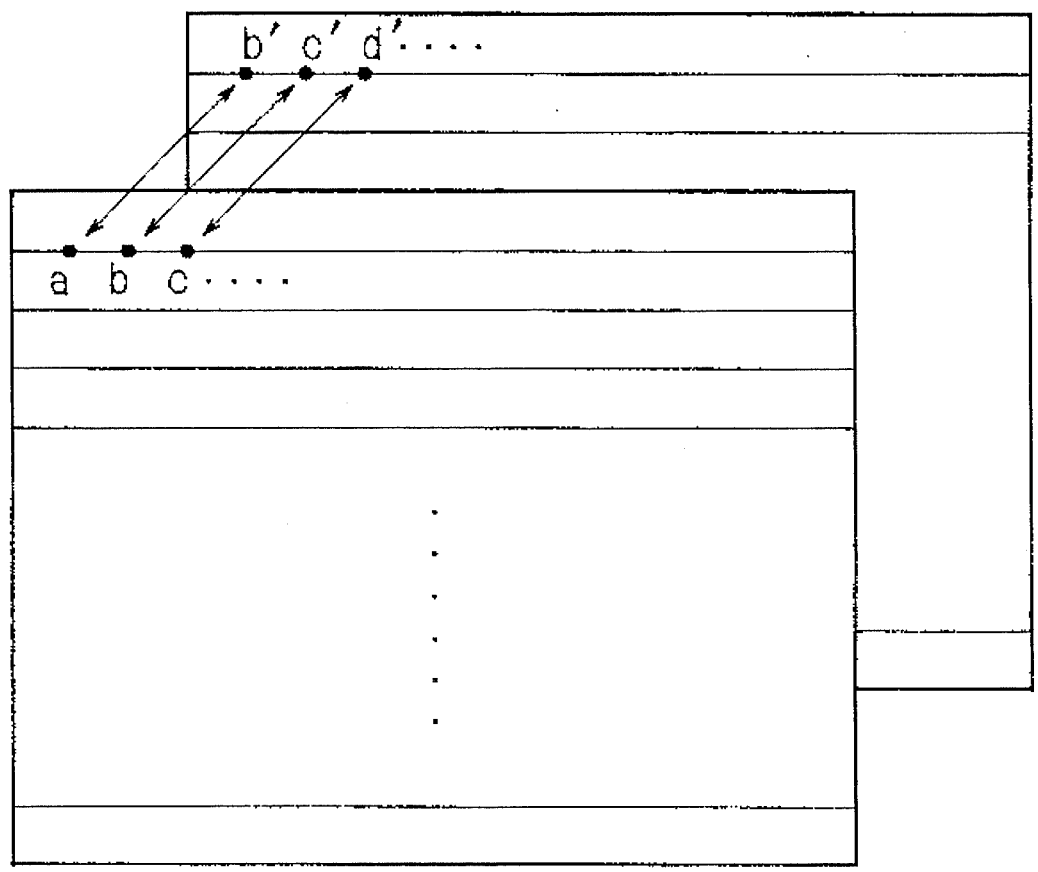

VIDEO SIGNAL PROCESSING APPARATUS, VIDEO SIGNAL PROCESSING METHOD, AND VIDEO SIGNAL RECORDING/REPRODUCTION APPARATUS

BACKGROUND OF THE INVENTION

1. Field of the Invention

The present invention relates to a video signal processing apparatus and a video signal processing method wherein processing in the direction of the time axis is performed by delaying only the effective picture period of standard video signal, and also relates to a video signal recording/reproduction apparatus incorporating such a video signal processing apparatus.

2. Description of the Related Art

An apparatus for improving video signal quality includes a video signal processing apparatus of the type that performs arithmetic operations in the direction of the time axis, for example, a three-dimensional luminance and chrominance signal separation filter, video signal noise suppressor, and field or frame interpolation apparatus. FIG. 1 is a block diagram showing a prior art configuration of such a video signal processing apparatus, and FIG. 2 is a schematic diagram showing a video signal in three-dimensional space. In FIG. 2, the direction of the time axis in the video signal is the direction of t axis, which is sometimes called the field direction or the frame direction. To perform arithmetic operations in the direction of the time axis, it is necessary to delay the video signal using a storage device such as a memory circuit; in this case, if the circuit is configured so that only the effective picture period, excluding the retrace interval, is stored in the memory circuit, the required capacity of the memory circuit can be reduced. The video signal processing apparatus of the prior art shown in FIG. 1 is an example of such a configuration wherein only the effective picture period is stored in the memory circuit and arithmetic operations are performed in the direction of the time axis.

In FIG. 1, the numeral 1 indicates an input terminal via which a video signal is inputted, and 2 designates an output terminal via which the video signal after arithmetic operations is outputted. The video signal, input via the inputted terminal 1, is fed to a synchronizing signal separation circuit 8, a memory circuit 10, and an arithmetic circuit 11, respectively. The synchronizing signal separation circuit 8 separates a synchronizing signal from the input video signal, and supplies the separated synchronizing signal to a reset circuit 6. The reset circuit 6 outputs a reset pulse to a counter circuit 7 in synchronization with the synchronizing signal. The counter circuit 7 performs a counting action upon reception of the reset pulse, and supplies the count value to a memory control circuit 9. The memory control circuit 9 controls the memory circuit, 10 in accordance with the count value. The memory circuit 10 is a storage circuit having the capacity necessary for delaying the input video signal in the direction of the time axis, and under the control of the memory control circuit 9, supplies the video signal delayed in the direction of the time axis to the arithmetic circuit 11. The arithmetic circuit 11 performs arithmetic operations in the direction of the time axis on the video signal supplied via the input, terminal 1 and the delayed video signal outputted from the memory circuit 10, and outputs the thus processed video signal at the output terminal 2.

Next, the operation of the above apparatus will be described below. The description below concerns a case where the vertical retrace interval is not stored in the memory circuit 10. The standard video signal is applied at the input terminal 1. The standard video signal is a video signal for which the relations defined by the following equations (1) and (2) hold among the color subcarrier frequency fsc, horizontal synchronizing signal frequency fh, and vertical synchronizing frequency fv.

$$fsc = (455/2)fh \qquad \text{Equation (1)}$$

$$fh = (525/2)fv \qquad \text{Equation (2)}$$

In the video signal processing apparatus shown in FIG. 1, a pulse signal synchronized to the color subcarrier of the input video signal and having a frequency equal to a multiple thereof is used as the clock.

FIG. 3 is a timing chart illustrating the operation of the various circuit blocks. The video signal, inputted via the input terminal 1, is fed to the synchronizing signal separation circuit 8, the memory circuit 10, and the arithmetic circuit 11, respectively. The synchronizing signal separation circuit 8 separates a vertical synchronizing signal from the input video signal, and supplies the separated vertical synchronizing signal to the reset circuit 6. In synchronism with the vertical synchronizing signal, the reset circuit 6 outputs a reset pulse to reset the counter circuit 7. The counter circuit 7, which is controlled by the reset pulse thus applied, performs a counting action and supplies the count value to the memory control circuit 9. In accordance with the count value from the counter circuit 7, the memory control circuit 9 outputs a control signal for a predetermined portion of the video signal to be written into the memory circuit 10, and a control signal for delaying the video signal in the direction of time axis when read out of the memory circuit 10; these control signals are supplied to the memory circuit 10. Then, in the arithmetic circuit 11, arithmetic operations in the direction of the time axis are performed between the input video signal from the input terminal 1 and the video signal from the memory circuit 10 delayed in the direction of the time axis, and the resulting video signal is outputted at the output terminal 2.

FIG. 4 is a diagram showing the positional relationship in the direction of the time axis between the input video signal and the video signal outputted from the memory circuit 10. In FIG. 4, arithmetic operations in the direction of time axis are arithmetic operations performed between a and a', between b and b' and between c and c', respectively. For all arithmetic data, the time spacing between arithmetic data is equal to an integral multiple of the field period 1/fv. The arithmetic operations performed here include, for example, three-dimensional luminance and chrominance signal separation, noise elimination, etc.

In the above-described configuration of the prior art video signal processing apparatus in which, to reduce the capacity of the memory circuit 10 for storing the video signal, arithmetic operations in the direction of the time axis are performed by delaying only the effective picture period of standard video signal, the portion of the video signal to be written into the memory circuit 10 is determined on the basis of the synchronizing signal that the synchronizing signal separation circuit separates from the video signal. Generally, when separating the synchronizing signal from the video signal in the synchronizing signal separation circuit 8, variations in the timing, called jitter, occur due to noise or waveform distortion superposed on the video signal, causing variations in the cycle of the synchronizing signal. Since the position of the video signal to be written into the memory circuit 10 is determined on the basis of the synchronizing signal, as described above, variations in the cycle of the synchronizing signal result in variations of the write position. FIG. 5 shows the positional relationship in the direction of the time axis between the input video signal and the video signal outputted from the memory circuit 10 when jitter is caused on the synchronizing signal. Normally, the output video signal should be stored in the memory circuit 10 as a', b', c' . . . , but when jitter is caused on the synchronizing signal, the signal is stored as b', c', d' . . . , in which case arithmetic operations are performed between a and b', between b and c', and between c and d'. The resulting problem is that the time spacing between the input video signal and the video signal outputted from the memory circuit 10 is no longer equal to an integral multiple of the field period, and therefore, arithmetic operations between the input video signal and the video signal outputted from the memory circuit 10 are not performed in the correct time axis direction in the arithmetic circuit 11.

SUMMARY OF THE INVENTION

It is a primary object of the invention to provide: a video signal processing apparatus in which arithmetic operations are performed in the direction of the time axis by delaying only the effective picture period of standard video signal, and which is capable of performing arithmetic operations in the correct time axis direction, with the time difference between the input, video signal and the video signal outputted from the memory circuit being maintained constant even if variations are caused in the synchronizing signal cycle by jitter associated with synchronizing signal separation; a video signal processing method used in such a video signal processing apparatus; and a video signal recording/reproduction apparatus incorporating such a video signal processing apparatus.

A video signal processing apparatus according to a first invention has synchronizing signal separating means for separating a first synchronizing signal from an input video signal, and synchronizing signal generating means for generating a second synchronizing signal having substantially the same cycle as the first synchronizing signal when a prescribed time has elapsed after the separation of the first synchronizing signal. The input video signal is stored by switching selection between the first synchronizing signal separated from the input video signal and the second synchronizing signal generated when the prescribed time has elapsed after the separation of the first, synchronizing signal and having substantially the same cycle as the first synchronizing signal. Accordingly, the input video signal can be stored correctly without being affected by variations in the synchronizing signal cycle that cause variations in signal write position.

In a video signal processing apparatus according to a second invention, which is a modification of the video signal processing apparatus of the first invention, after the input of the video signal is started the input video signal is stored on the basis of the first synchronizing signal, and after the prescribed time has elapsed the input video signar is stored on the basis of the second synchronizing signal. Accordingly, the input video signal is stored on the basis of stable synchronizing signal free from timing variations.

A video signal processing apparatus according to a third invention has: arithmetic means for performing arithmetic operations between input video signals displaced from each other in the direction of time axis; synchronizing signal separating means for separating a synchronizing signal from the current input signal; synchronizing signal generating means for generating a synchronizing signal independently of the input video signal; and means for obtaining a delayed input video signal by switching selection between the synchronizing signal from the synchronizing signal separating means and the synchronizing signal from the synchronizing signal generating means. Since the delayed input video signal is obtained by switching selection between the two synchronizing signals, the time difference between the current input video signal and the delayed video signal output is maintained constant even if variations occur due to jitter in the synchronizing signal separated from the current input video signal. This ensures arithmetic operations being performed by the arithmetic means in the correct time axis direction.

A video signal processing apparatus according to a fourth invention has: synchronizing signal separating means for separating a synchronizing signal from the current video signal; synchronizing signal generating means for generating a synchronizing signal independently of the input video signal; and switching means for switching selection between the synchronizing signal from the synchronizing signal separating means and the synchronizing signal from the synchronizing signal generating means. Since selection is made between the two synchronizing signals, the time difference between the current input video signal and the delayed video signal output is maintained constant even if variations occur due to jitter in the synchronizing signal separated from the current input video signal. This ensures arithmetic operations in the correct time axis direction.

In a video signal processing apparatus according to a fifth invention, which is a modification of the video signal processing apparatus of the fourth invention, switching is made so that when the input of the video signal is started, the synchronizing signal from the synchronizing signal separating means is used, and after a prescribed time has elapsed, the synchronizing signal from the synchronizing signal generating means is used. Since the synchronizing signal is switched so that when the processing is started, the synchronizing signal separated from the current input signal is used, and after the prescribed time has elapsed, the generated synchronizing signal is used, as described above, the synchronizing signal separated from the current input video signal and subject to cycle variations due to jitter is not used, and the time difference between the current input video signal and the delayed input video signal is maintained constant without fail.

A video signal processing apparatus according to a sixth invention has: storage means for storing an input video signal for a predetermined length of time; arithmetic means for performing arithmetic operations between the input video signal and an output of the storage means; synchronizing signal separating means for separating a synchronizing signal from the input video signal; synchronizing signal generating means for generating a synchronizing signal independently of the input video signal; and control means for controlling write/read operations of the storage means by switching between the synchronizing signal from the synchronizing signal separating means and the synchronizing signal from the synchronizing signal generating means. Since the operation of the storage means is controlled by switching selection between the two synchronizing signals, the time difference between the current input video signal and the delayed input video signal output from the storage means is maintained constant even if variations occur due to jitter in the cycle of the synchronizing signal separated from the current input video signal. This ensures arithmetic operations being performed by the arithmetic means in the correct time axis direction.

A video signal processing apparatus according to a seventh invention has: storage means for storing an input video signal for a predetermined length of time; arithmetic means for performing arithmetic operations between the input video signal and an output of the storage means; storage control means for controlling the storage means; counter means for controlling the storage control means; synchronizing signal separating means for separating a synchronizing signal from the input video signal; synchronizing signal generating means for generating a synchronizing signal based on a count value outputted from the counter means; and switching means for switching between the synchronizing signal from the synchronizing signal separating means and the synchronizing signal from the synchronizing signal generating means for output to the storage control means. Since selection is made between the synchronizing signal separated from the input video signal and the synchronizing signal generated on the basis of the count value from the counter means, and the selected synchronizing signal is supplied to the storage control means, the time difference between the current input video signal and the delayed input video signal outputted from the storage means is maintained constant even if variations occur due to jitter in the cycle of the synchronizing signal separated from the current input video signal. This ensures arithmetic operations being performed by the arithmetic means in the correct time axis direction.

A video signal processing apparatus according to an eighth invention has: storage means for storing an input video signal for a predetermined length of time; arithmetic means for performing arithmetic operations between the input video signal and an output of the storage means; storage control means for controlling the storage means; counter means for controlling the storage control means; synchronizing signal generating means for generating a synchronizing signal based on a count value outputted from the counter means; switching means for switching between an output of the synchronizing signal generating means and a synchronizing signal outputted from a synchronizing signal separating means; and a timer means for switching the switching means with prescribed timing. Switching is made by the action of the timer means between the synchronizing signal outputted from the synchronizing signal separating means and the synchronizing signal outputted from the synchronizing signal generating means, and the result of the switching is supplied to a resetting means. Accordingly, after the activation of the timer means, even if variations occur due to jitter in the cycle of the synchronizing signal outputted from the synchronizing signal separating means, the time difference between the input video signal and the delayed video signal outputted from the storage means is maintained constant, ensuring arithmetic operations in the correct time axis direction.

In a video signal processing apparatus according to a ninth invention, which is a modification of the video signal processing apparatus of the seventh or eighth invention, the counter means is constructed from a vertical-direction counter circuit, the synchronizing signal separating means from a vertical synchronizing signal separation circuit, and the synchronizing signal generating means from a vertical synchronizing signal generating circuit. This construction allows saving in the capacity of the storage means for storing the vertical retrace interval, which contributes to reducing the capacity of the storage means.

In a video signal processing apparatus according to a 10th invention, which is a modification of the video signal processing apparatus of the seventh or eighth invention, the counter means is constructed from a horizontal-direction counter circuit, the synchronizing signal separating means from a horizontal synchronizing signal separation circuit, and the synchronizing signal generating means from a horizontal synchronizing signal generating circuit. This construction allows saving in the capacity of the storage means for storing the horizontal retrace interval, which contributes to reducing the capacity of the storage means.

A video signal processing apparatus according to an 11th invention, which is a modification of the video signal processing apparatus of the 10th invention, further includes the same vertical-direction counter circuit and vertical synchronizing signal separation circuit as included in the ninth invention, and a vertical-direction reset circuit for generating a pulse to reset the vertical-direction counter circuit. This construction allows saving in the capacity of the storage means for storing the horizontal retrace and vertical retrace intervals, further reducing the capacity of the storage means.

A video signal processing apparatus according to a 12th invention, which is a modification of the video signal processing apparatus of the sixth, seventh, eighth, ninth, 10th, or 11th invention, further includes extracting means for extracting from the input video signal only a portion of video signal or video information necessary for the arithmetic operations performed in the direction of time axis, and for supplying same to the storage means. Since provisions are made so that only the portion of input video signal or input video signal information necessary for the arithmetic operations performed in the arithmetic means is delayed using the storage means, a further reduction in the capacity of the storage means is achieved as compared to the configuration where the whole input video signal or the input video signal itself is delayed.

A video signal processing apparatus according to a 13th invention, which is a modification of the video signal processing apparatus of the eighth, ninth, 10th or 11th invention, further includes detecting means for detecting whether the input video signal is a standard video signal or a non-standard video signal, and controls the timer means in accordance with the result of the detection fed from the detecting means. Since the timer means is controlled according to whether the input video signal is a standard video signal or a non-standard video signal, malfunctioning can be prevented that may occur when the input video signal switches to a non-standard video signal and then switches back to the standard signal.

In a video signal processing method according to a 14th invention, a first synchronizing signal is separated from the input video signal, and when a predetermined time has elapsed after the separation of the first synchronizing signal, a second synchronizing signal is generated that has substantially the same cycle as the first synchronizing signal. Accordingly, a synchronizing signal free from cycle variations can be obtained.

In a video signal processing method according to a 15th invention, which is a modification of the video signal processing method of the 14th invention, the predetermined time is the time that the second synchronizing signal to be generated takes to become substantially synchronized to the first synchronizing signal. Since the second synchronizing signal is generated after the time it takes to become substantially synchronized to the first synchronizing signal, it is ensured that the resulting synchronizing signal is free from timing variations.

In a video signal processing method according to a 16th invention, a delayed input video signal is obtained by switching selection between the synchronizing signal separated from the current input video signal and the generated synchronizing signal, and arithmetic operations are performed between the current input video signal and the delayed input video signal. Since the delayed input video signal is obtained by switching selection between the two synchronizing signals, the time difference between the current input video signal and the delayed input video signal is maintained constant even if variations occur due to jitter in the cycle of the synchronizing signal separated from the current input video signal. This ensures arithmetic operations being performed between the two video signals in the correct time axis direction.

In a video signal processing method according to a 17th invention, which is a modification of the video signal processing method of the 16th invention, switching is made so that the synchronizing signal separated from the current input video signal is used when the input of the video signal is started, and after a prescribed time has elapsed, the generated synchronizing signal is used. Since the synchronizing signal is switched so that the synchronizing signal separated from the current input signal is used when the processing is started, and after the prescribed time has elapsed, the generated synchronizing signal is used, as described above, the synchronizing signal separated from the current input video signal and subject to cycle variations due to jitter is not used, and the time difference between the current input video signal and the delayed input video signal is maintained constant without fail.

In a video signal processing method according to an 18th invention, which is a modification of the video signal processing method of the 16th or 17th invention, only a portion of an input video signal portion or input video signal information necessary for the arithmetic operations is extracted, and a delayed video signal or video information is obtained only for the extracted input video signal or video information. Since the delayed video signal or delayed video information is obtained only for the portion of input video signal or input video signal information necessary for the arithmetic operations, the capacity of the storage means can be reduced as compared to the configuration where the whole input video signal or the input video signal itself is delayed.

In a video signal processing method according to a 19th invention, judgment is made as to whether the input video signal is a standard video signal or a non-standard video signal, and selection is made between the synchronizing signal separated from the current input video signal and the generated synchronizing signal in accordance with the result of the judgment. Since the synchronizing signal to be used is selected according to whether the input video signal is a standard video signal or a non-standard video signal, malfunctioning can be prevented that may occur when the input video signal switches to a non-standard video signal and then switches back to the standard signal.

A video signal recording/reproduction apparatus according to a 20th invention has: synchronizing signal separating means for separating a synchronizing signal from a current input video signal; synchronizing signal generating means for generating a synchronizing signal independently of the current video signal; and means for obtaining a delayed video signal by switching selection between the synchronizing signal from the synchronizing signal separating means and the synchronizing signal from the synchronizing signal generating means. Since the delayed input video signal is obtained by switching selection between the two synchronizing signals, the time difference between the current input video signal and the delayed input video signal is maintained constant even if variations occur, due to jitter, in the cycle of the synchronizing signal separated from the current input video signal. This ensures arithmetic operations being performed between the two video signals in the correct time axis direction.

A video signal recording/reproduction apparatus according to a 21st invention has: storage means for storing a video signal for a predetermined length of time; arithmetic means for performing arithmetic operations between the video signal and an output of the storage means; synchronizing signal separating means for separating a synchronizing signal from the video signal: synchronizing signal generating means for generating a synchronizing signal independently of the current video signal; and control means for controlling the operation of the storage means by switching selection between the synchronizing signal from the synchronizing signal separating means and the synchronizing signal from the synchronizing signal generating means. Since the operation of the storage means is controlled by switching selection between the two synchronizing signals, the time difference between the current video signal and the delayed video signal outputted from the storage means is maintained constant even if variations occur due to jitter in the cycle of the synchronizing sign&l separated from the current video signal. This ensures arithmetic operations being performed by the arithmetic means in the correct time axis direction.

A video signal recording/reproduction apparatus according to a 22nd invention includes the video signal processing apparatus of the seventh or eighth invention. Since selection is made between the synchronizing signal separated from the current video signal and the synchronizing signal generated on the basis of the count value from the counter means, and the selected synchronizing signal is supplied to the storage control means, the time difference between the current video signal and the delayed video signal outputted from the storage means is maintained constant even if variations occur due to jitter in the cycle of the synchronizing signal separated from the current video signal. This ensures arithmetic operations being performed by the arithmetic means in the correct time axis direction.

A video signal recording/reproduction apparatus according to a 23rd invention includes the video signal processing apparatus of the 12th or 13th invention. Since provisions are made so that only the portion of video signal or video signal information necessary for the arithmetic operations performed in the arithmetic means is delayed using the storage means, a further reduction in the capacity of the storage means is achieved as compared to the configuration where the whole video signal or the video signal itself is delayed. Furthermore, since the timer means is controlled according to whether the video signal is a standard video signal or a non-standard video signal, malfunctioning can be prevented that may occur when the video signal switches to a non-standard video signal and then switches back to the standard signal.

The above and further objects and features of the invention will more fully be apparent from the following detailed description with accompanying drawings.

BRIEF DESCRIPTION OF THE DRAWINGS

FIG. 5 is a diagram showing the positional relationship in the direction of time axis between the input video signal and the video signal outputted from the memory circuit when jitter is superposed on the synchronizing signal;

DESCRIPTION OF THE PREFERRED EMBODIMENTS

The preferred embodiments of the present invention will be described in detail below with reference to the accompanying drawings.

Embodiment 1

Figure 1:
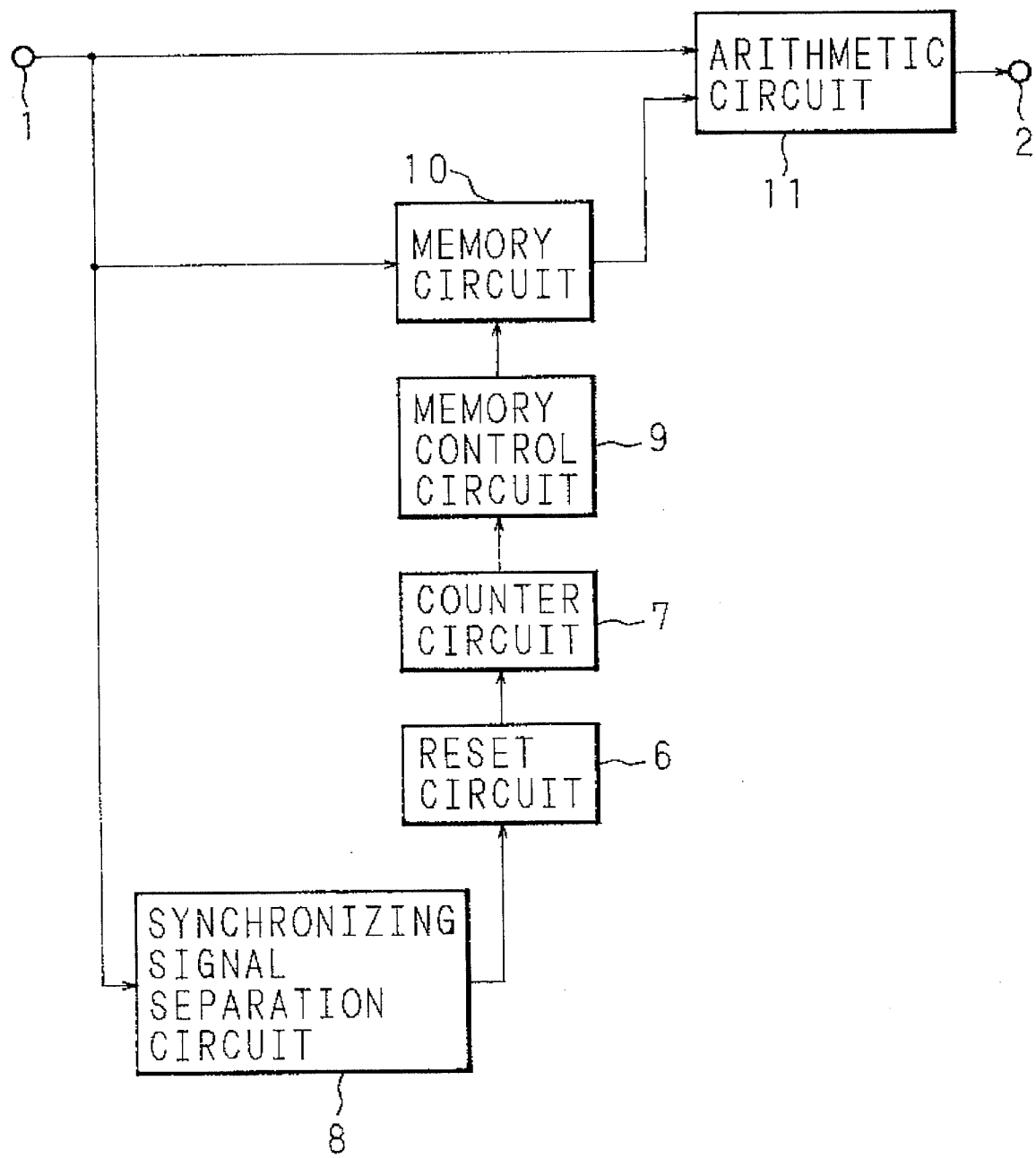
FIG. 1 is a diagram showing the configuration of a video signal processing apparatus according to the prior art.
Figure 2:
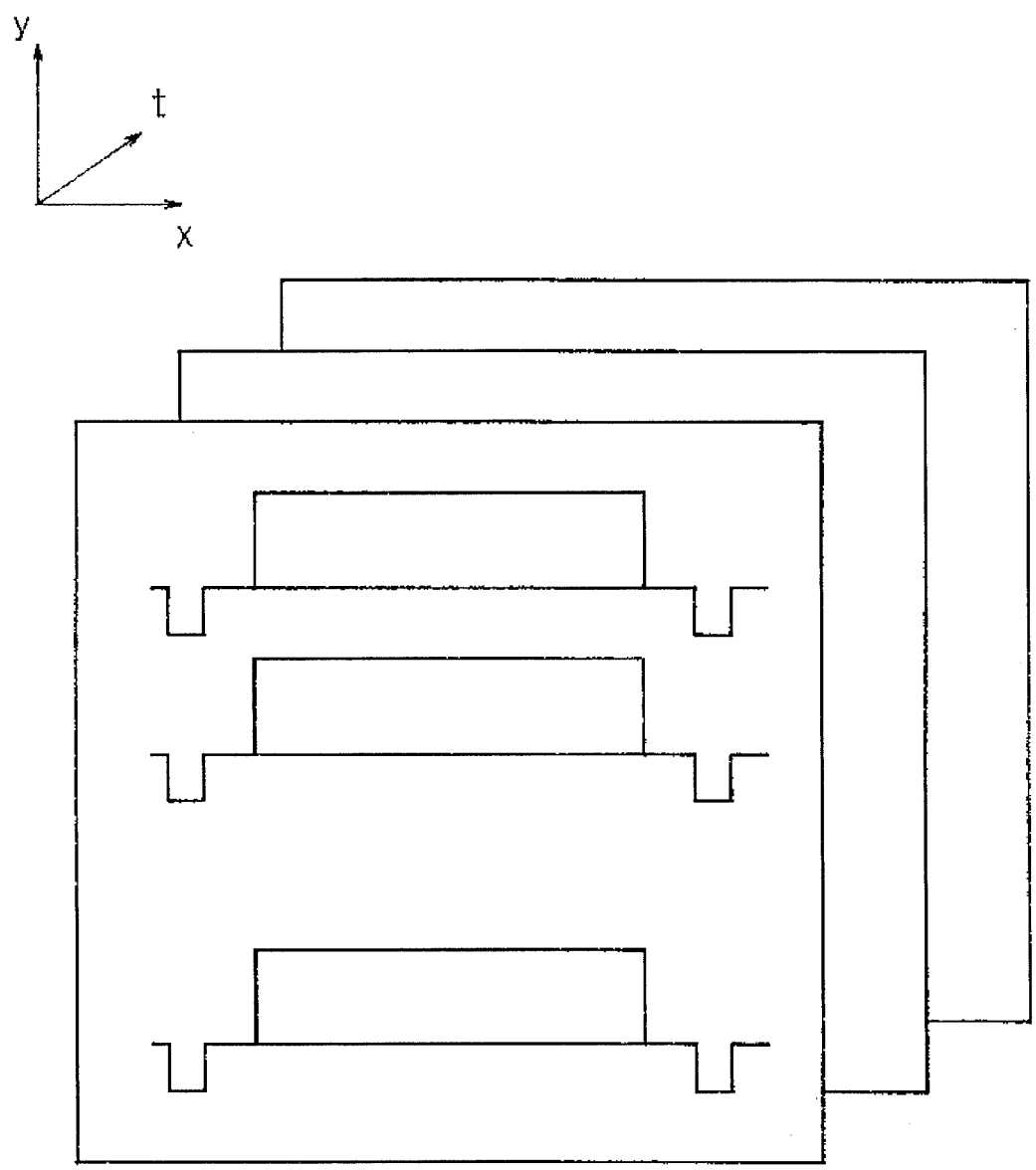
FIG. 2 is a schematic diagram showing a video signal in three-dimensional space.
Figure 3:
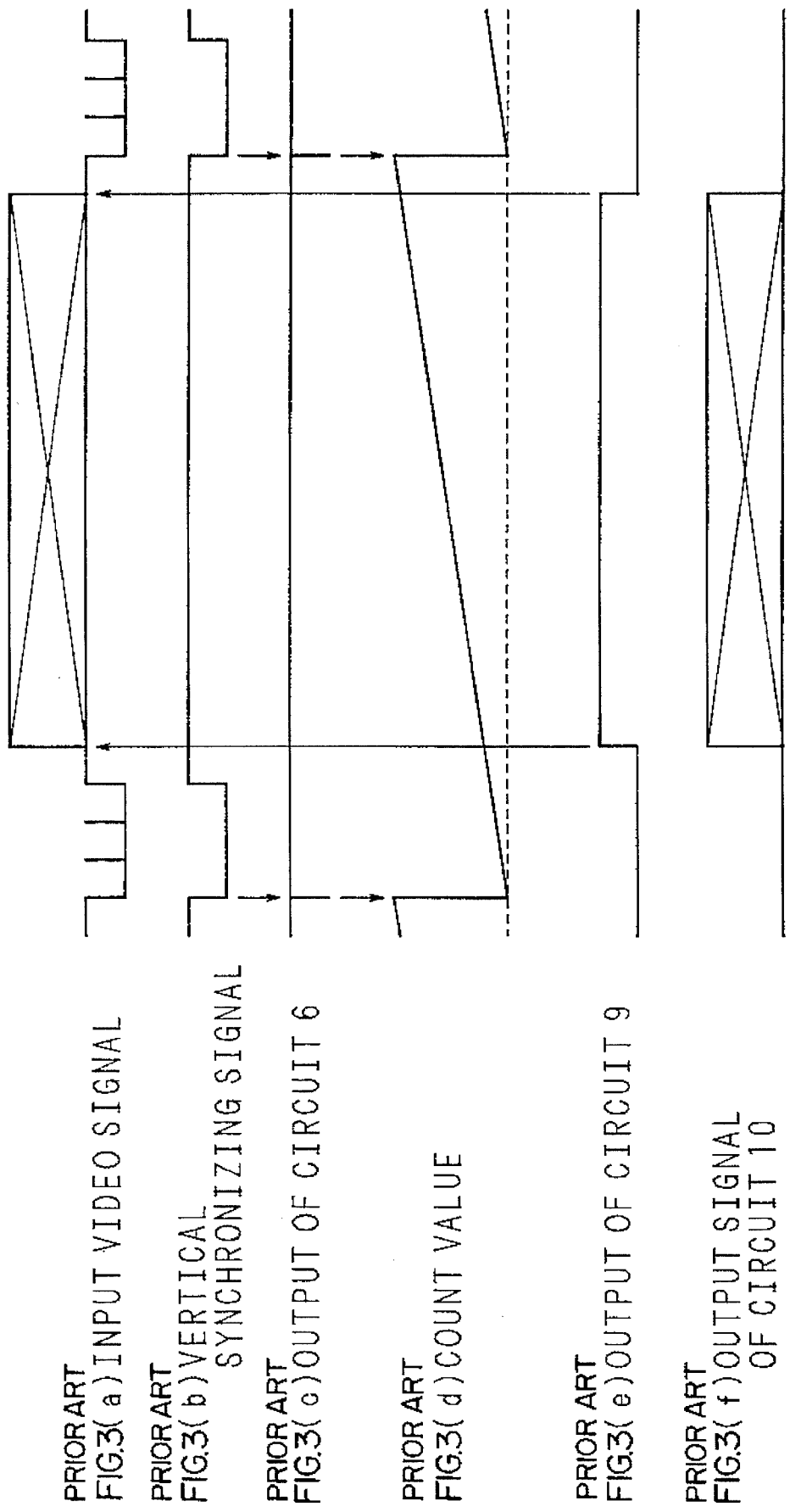
FIG. 3 is a timing chart illustrating the operation of various circuit blocks in the prior art video signal processing apparatus.
Figure 4:
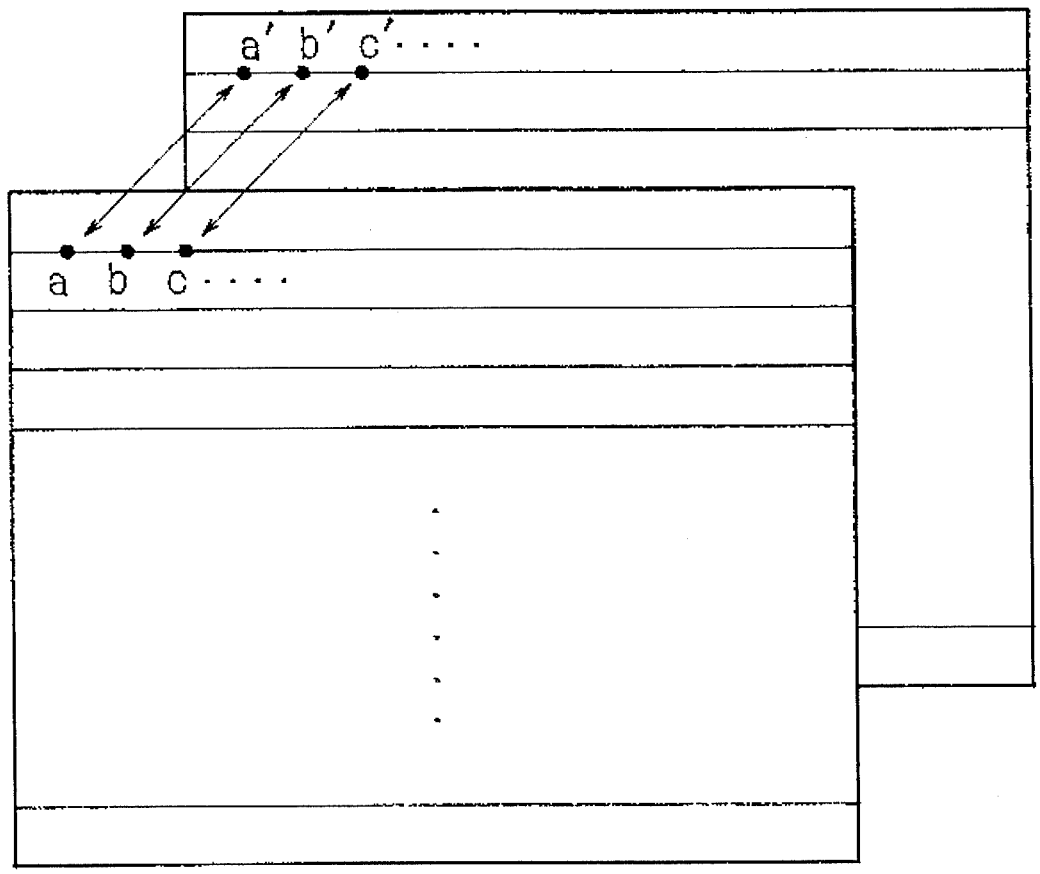
FIG. 4 is a diagram showing the positional relationship in the direction of time axis between an input video signal and a video signal outputted from a memory circuit.
Figure 6:
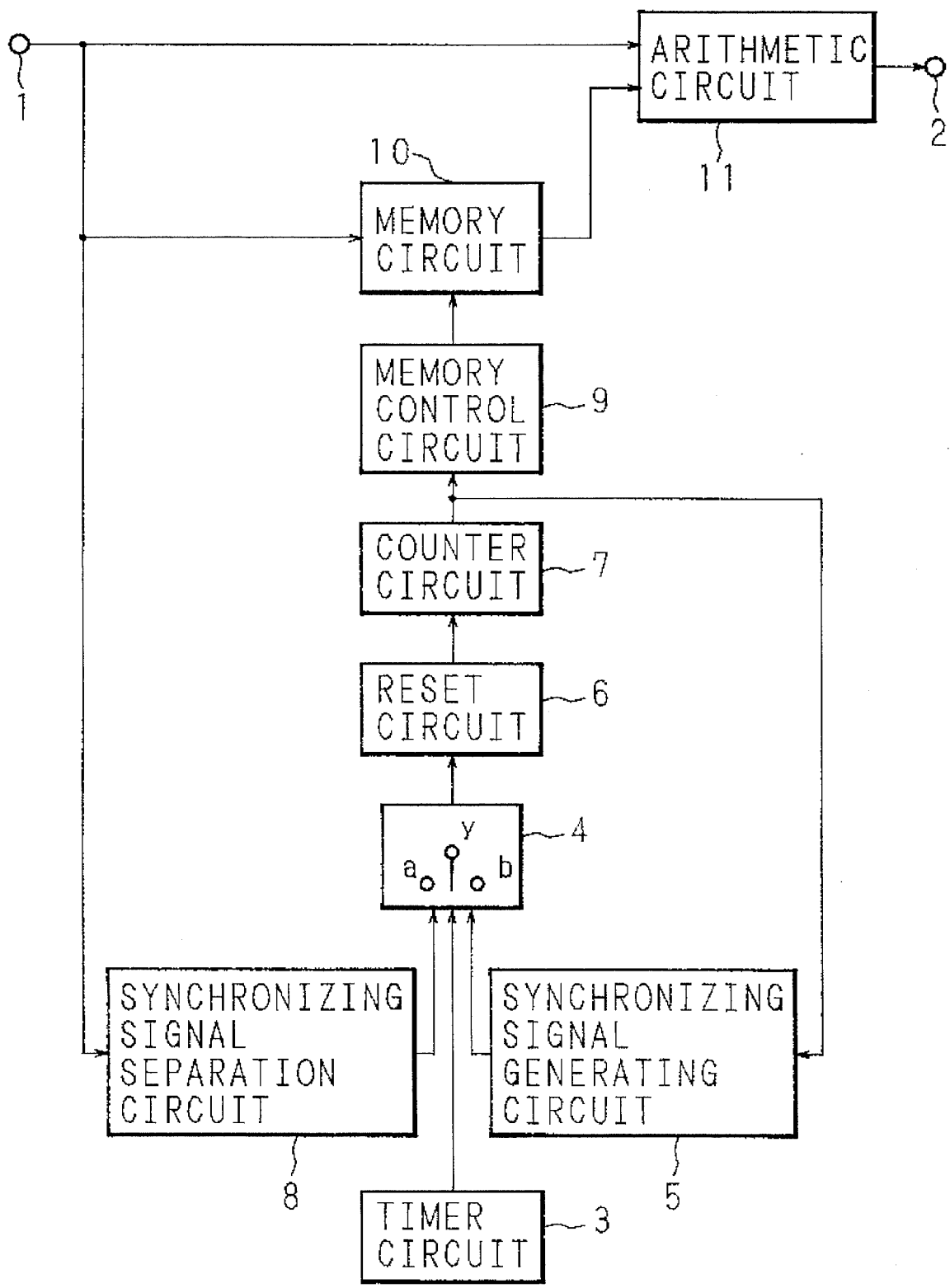
FIG. 6 is a diagram showing the configuration of a video signal processing apparatus according to a first embodiment.

FIG. 6 is a block diagram showing the configuration of a video signal processing apparatus according to a first embodiment of the invention. In FIG. 6, the same parts as those shown in FIG. 1 are designated by the same numerals, and description of such parts will not be repeated herein. The difference between the configuration shown in FIG. 6 and that in FIG. 1 is that a timer circuit 3, a switch circuit 4, and a synchronizing signal generating circuit 5 are added.

The synchronizing signal generating circuit 5 generates a synchronizing signal based on the count value outputted from the counter circuit 7, and applies it to an input terminal b of the switch circuit 4. The switch circuit 4 selects either the synchronizing signal outputted from the synchronizing signal separation circuit 8 or the synchronizing signal generated by the synchronizing signal generating circuit 5 by switching the connection of an output terminal y between an input terminal a, which is connected to the synchronizing signal separation circuit 8, and the above-mentioned input terminal b. When the time has elapsed that is required for the operating cycle of the loop consisting of the synchronizing signal generating circuit 5, the switch circuit 4, the reset circuit 6, and the counter circuit 7, to become synchronized to the synchronizing signal outputted from the synchronizing signal separation circuit 8 when the input terminal a is connected to the output terminal y in the switch circuit 4, the timer circuit 3 outputs a signal for switching the connection of the output terminal y in the switch circuit 4 from the input terminal a to the input terminal b.

Next, the operation of the above apparatus will be described. As in the prior art example described previously, the standard video signal is applied to the input terminal 1, and a pulse signal synchronized to the color subcarrier of the input video signal and having a frequency equal to a multiple thereof is used as the clock for this apparatus. In the switch circuit 4, the input terminal a is connected to the output terminal y at the start of the operation of the apparatus, and the reset circuit 6, the counter circuit 7, the remote control circuit 9, and the memory circuit 10 operate by being synchronized to the synchronizing signal outputted from the synchronizing signal separation circuit 8. When the above-stated predetermined time has elapsed, the connection of the output terminal y in the switch circuit 4 is switched to the input terminal b in accordance with the output signal from the timer circuit 3.

Figure 7:
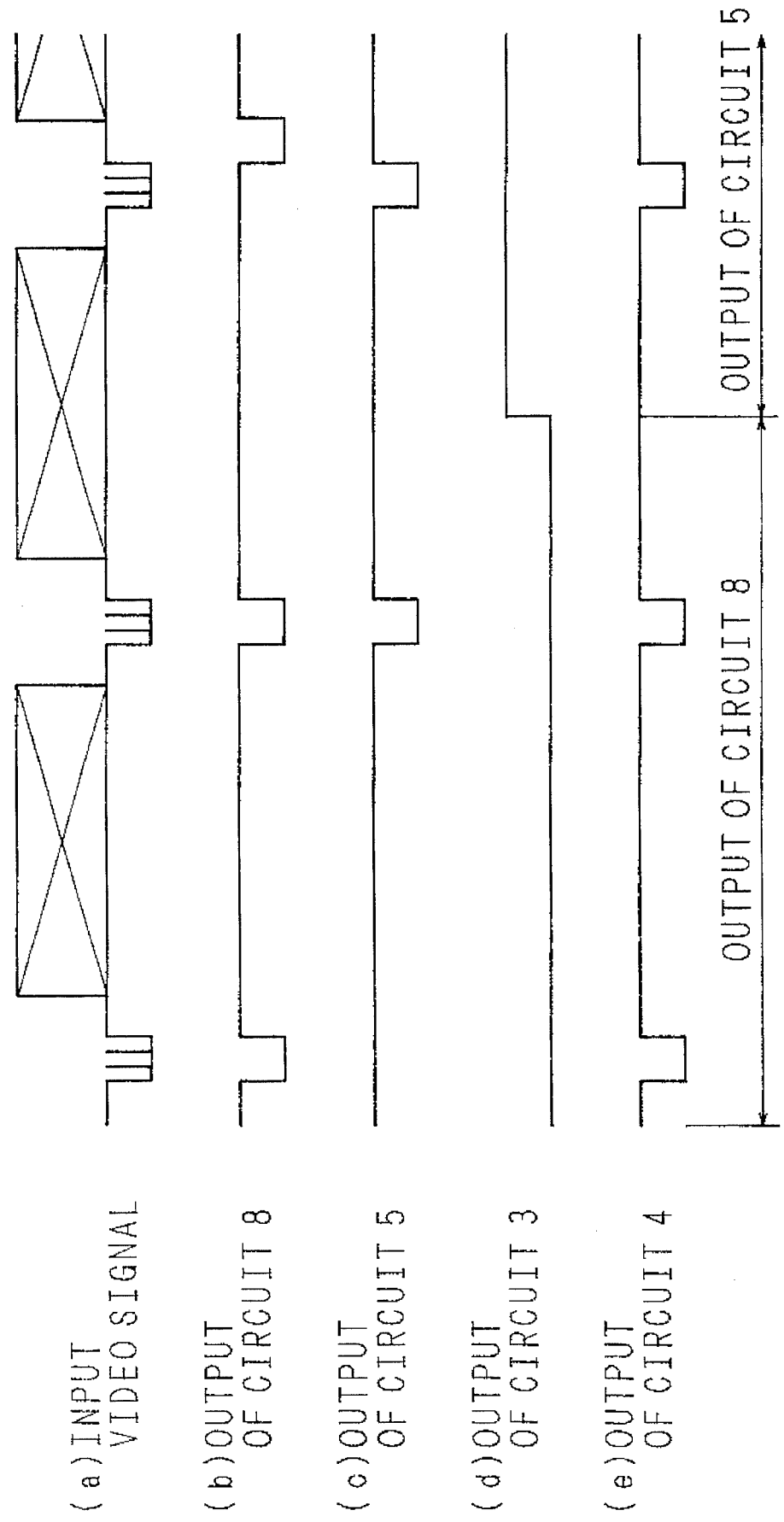
FIG. 7 is a timing chart illustrating the operation of various circuit blocks in the video signal processing apparatus according to the first embodiment.

After that, the signal generated by the synchronizing signal generating circuit 5 based on the count value from the counter circuit 7 is used as the synchronizing signal in the above apparatus. FIG. 7 shows a timing chart showing the operation of the various circuit blocks. The synchronizing signal generated by the synchronizing signal generating circuit 5 is synchronized to the input video signal, satisfies the relations defined by the previously given equations (1) and (2), and is independent of the operation of the synchronizing signal separation circuit 8; therefore, this synchronizing signal is unaffected by the jitter that causes variations in the synchronizing signal cycle. As a result, in the arithmetic circuit 11, the time difference between the input video signal directly supplied from the input terminal 1 and the delayed video signal supplied from the memory circuit 10 is maintained constant at all times, ensuring arithmetic operations in the correct time axis direction.

Embodiment 2

Figure 8:
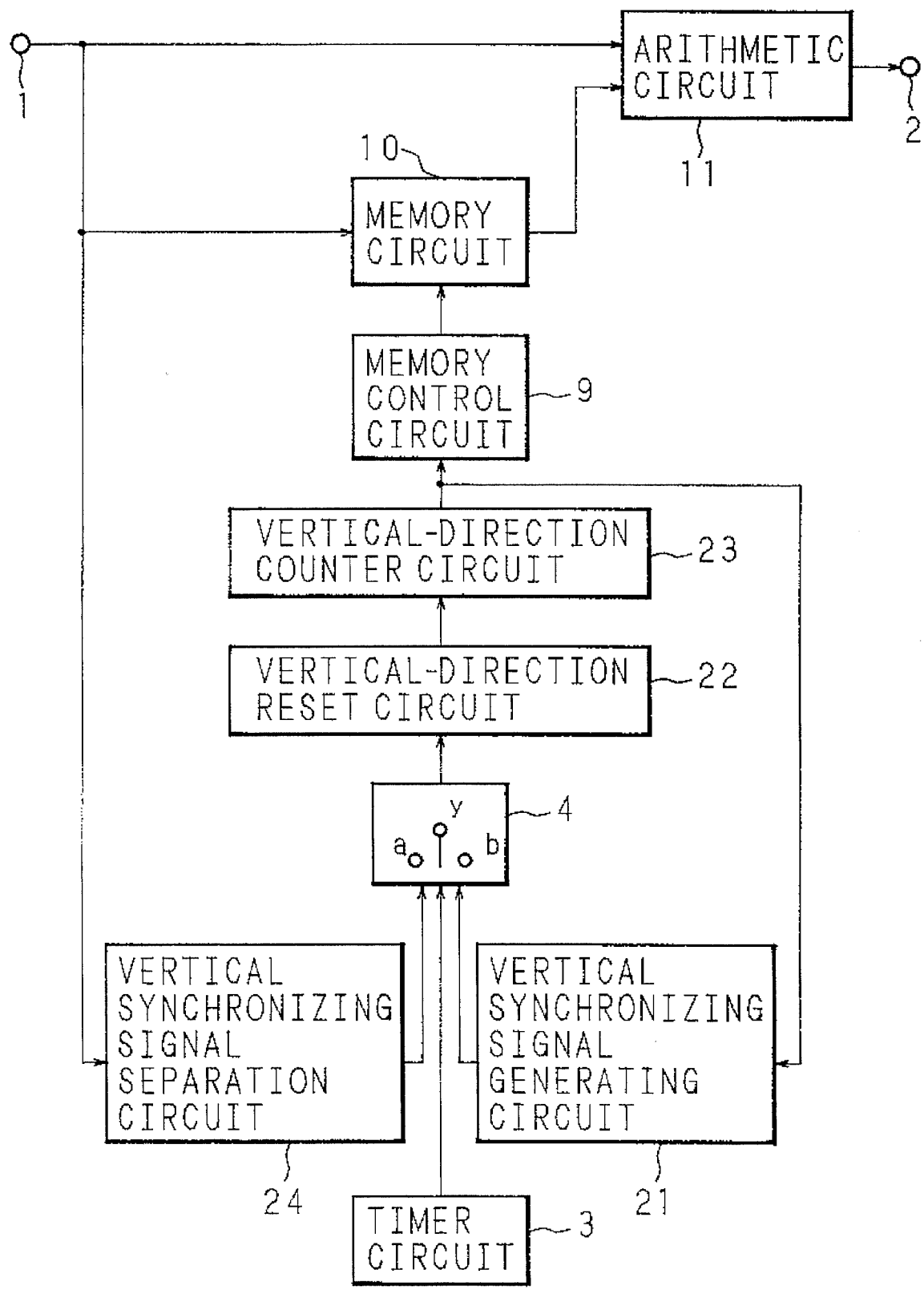
FIG. 8 is a diagram showing the configuration of a video signal processing apparatus according to a second embodiment.

FIG. 8 is a block diagram showing the configuration of a video signal processing apparatus according to a second embodiment of the invention. In the configuration of the second embodiment shown in FIG. 8, the synchronizing signal separation circuit 8 in the first embodiment shown in FIG. 6 is replaced by a vertical synchronizing signal separation circuit 24, the reset circuit 6 by a vertical-direction reset circuit 22, the counter circuit 7 by a vertical-direction counter circuit 23, and the synchronizing signal generating circuit 5 by a vertical synchronizing signal generating circuit 21. In other respects, the second embodiment is identical to the first embodiment, and description of the construction and operation of the other parts will not be repeated herein.

The operation of the second embodiment, is the same as that of the first embodiment. In the second embodiment, since the circuit configuration is modified as stated above, there is no need to write the vertical retrace interval of the input video signal into the memory circuit 10, and consequently, the capacity of the memory circuit 10 can be reduced by that amount. More specifically, this embodiment achieves a saving of about 7.6% in the capacity of the memory circuit 10, as compared with the configuration that requires the whole input video signal to be stored in the memory circuit 10.

Embodiment 3

Figure 9:
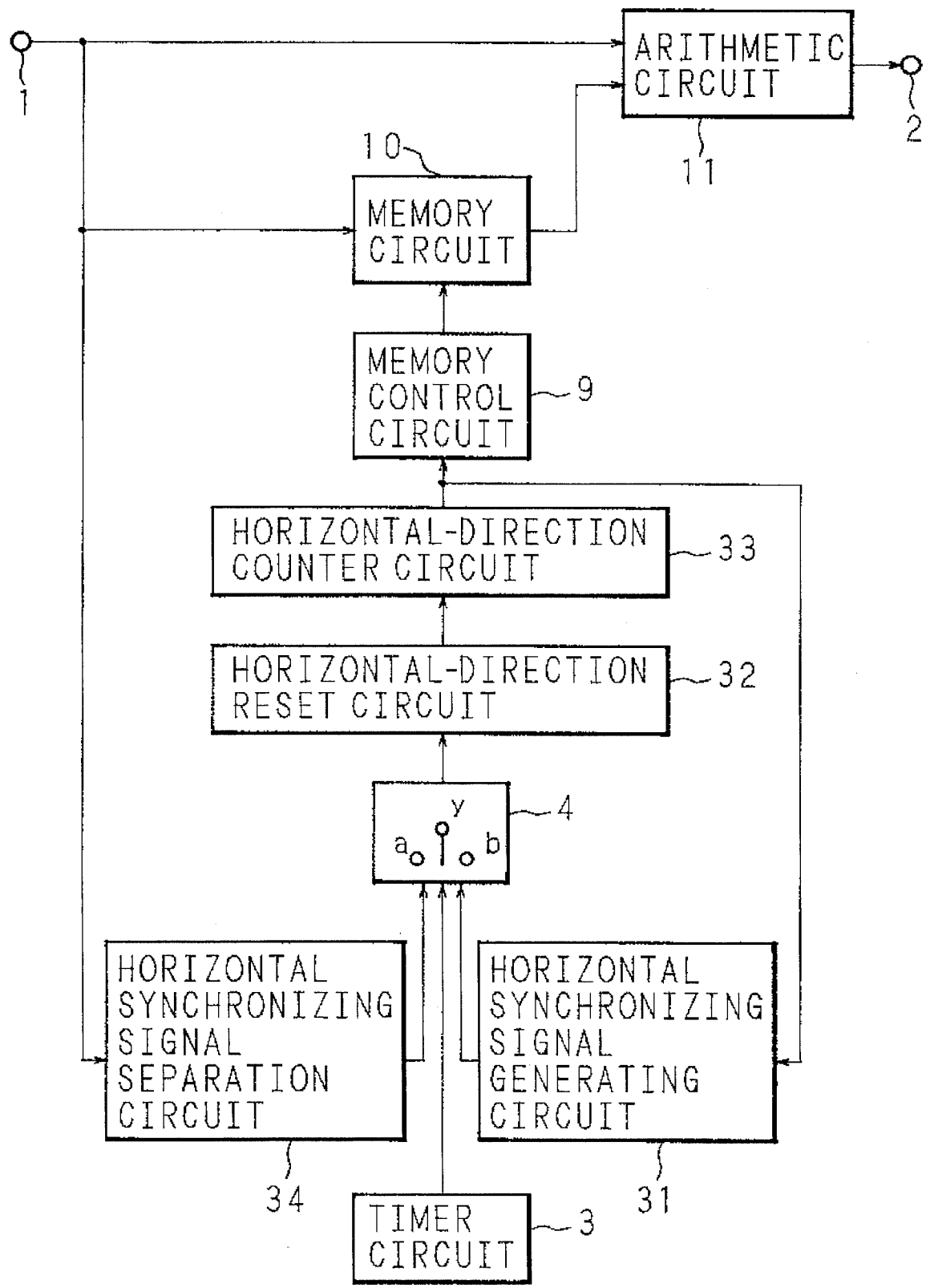
FIG. 9 is a diagram showing the configuration of a video signal processing apparatus according to a third embodiment.

FIG. 9 is a block diagram showing the configuration of a video signal processing apparatus according to a third embodiment of the invention. In the configuration of the third embodiment shown in FIG. 9, the synchronizing signal separation circuit 8 in the first embodiment shown in FIG. 6 is replaced by a horizontal synchronizing signal separation circuit 34, the reset circuit 6 by a horizontal-direction reset circuit 32, the counter circuit 7 by a horizontal-direction counter circuit 33, and the synchronizing signal generating circuit 5 by a horizontal synchronizing signal generating circuit 31; in other respects, the third embodiment is identical to the first embodiment, and description of the construction and operation of the other parts will not be repeated herein.

The operation of the third embodiment is the same as that of the first embodiment. In the third embodiment, since the circuit configuration is modified as stated above, there is no need to write the horizontal retrace interval of the input video signal into the memory circuit 10, and consequently, the capacity of the memory circuit 10 can be further reduced as compared to the second embodiment. More specifically, the third embodiment achieves a saving of about 9.5% in the capacity of the memory circuit 10, as compared with the configuration that requires the whole input video signal to be stored in the memory circuit 10.

Embodiment 4

Figure 10:
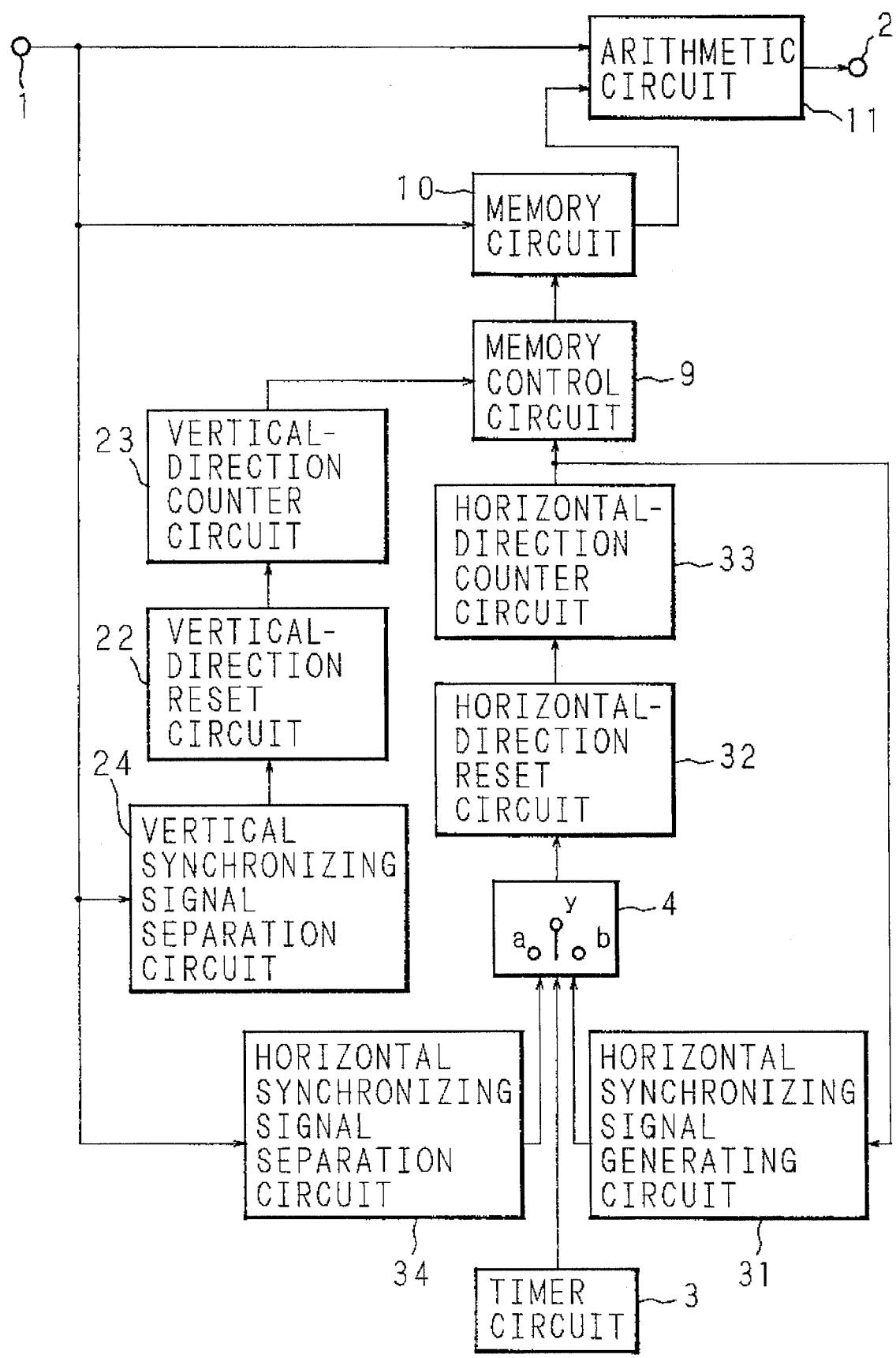
FIG. 10 is a diagram showing the configuration of a video signal processing apparatus according to a fourth embodiment.

FIG. 10 is a block diagram showing the configuration of a video signal processing apparatus according to a fourth embodiment of the invention. The configuration of the fourth embodiment shown in FIG. 10 is the same as that of the third embodiment shown in FIG. 9, except that the same vertical synchronizing signal separation circuit 24, vertical-direction reset circuit 22, and vertical-direction counter circuit. 23 as those in the second embodiment shown in FIG. 8 are added. Description of the construction and operation of the other parts, therefore, will not be repeated herein.

As in the second embodiment, since the vertical synchronizing signal separation circuit 24, the vertical-direction reset circuit 22, and the vertical-direction counter circuit 23 are provided in combination, the portion of the video signal to be written into the memory circuit 10 can be specified in the vertical direction. As a result, the vertical retrace interval is not stored in the memory circuit 10, achieving a further saving in the capacity of the memory circuit 10 as compared with the third embodiment; that is, the fourth embodiment achieves a greater reduction in the capacity of the memory circuit 10 than any of the first, second, and third embodiments. More specifically, the configuration of the present embodiment achieves a saving of about 16.4% in the capacity of the memory circuit 10, as compared with the configuration that requires the whole input video signal to be stored in the memory circuit 10.

Embodiment 5

Figure 11:
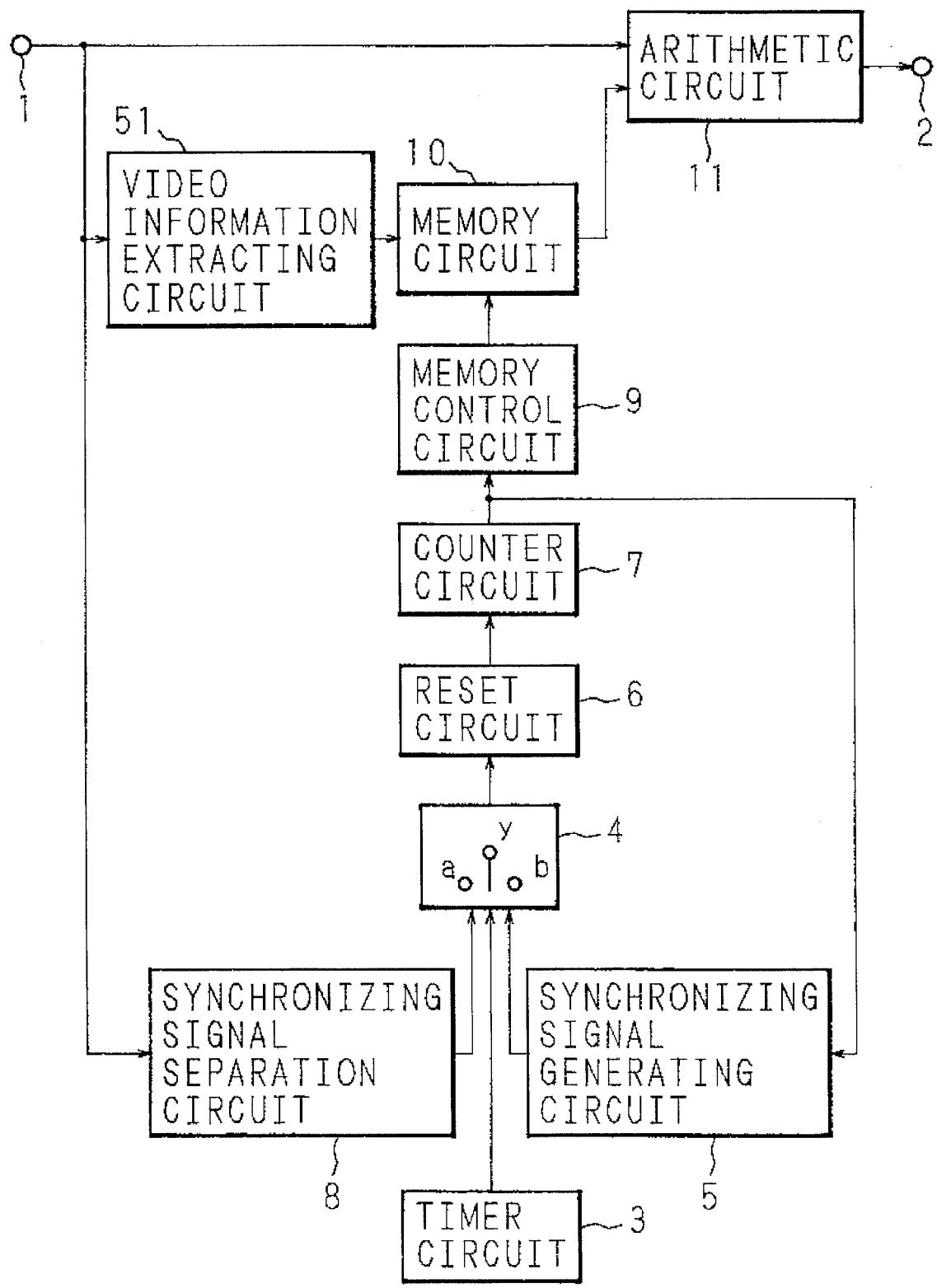
FIG. 11 is a diagram showing the configuration of a video signal processing apparatus according to a fifth embodiment.

FIG. 11 is a block diagram showing the configuration of a video signal processing apparatus according to a fifth embodiment of the invention. The configuration of the fifth embodiment shown in FIG. 11 is identical to that of the first embodiment shown in FIG. 6, except that a video information extracting circuit 51 is added. Description of the construction and operation of the other parts, therefore, will not be repeated herein.

The video information extracting circuit 51 is a circuit that extracts only the information necessary for the arithmetic operations in the arithmetic circuit 11. Generally, the amount of data in the extracted video information is less than the amount of data in the video signal before extraction. Therefore, by supplying the video information outputted from the video information extracting circuit 51 as input data to the memory circuit 10, the capacity of the memory circuit 10 can be further reduced in the first, second, third, and fourth embodiments. One specific application example of the fifth embodiment is a ghost eliminator that eliminates the ghost, a phenomenon caused by the reflection of the transmitted video signal. In this application, the video information extracting circuit 51 is configured as a gate circuit for extracting the signal superposed on the video signal for ghost elimination, and the arithmetic circuit. 11 performs arithmetic operations to extract the transmission characteristic of the video signal transmission path. Another specific application example of the fifth embodiment is a noise suppressor that suppresses noise by performing arithmetic operations in the direction of time axis. In this application, the video signal information extracting circuit 51 extracts noise components over the entire screen, and the extracted noise components, not the video signal itself, are stored in the memory circuit, 10.

Embodiment 6

Figure 12:
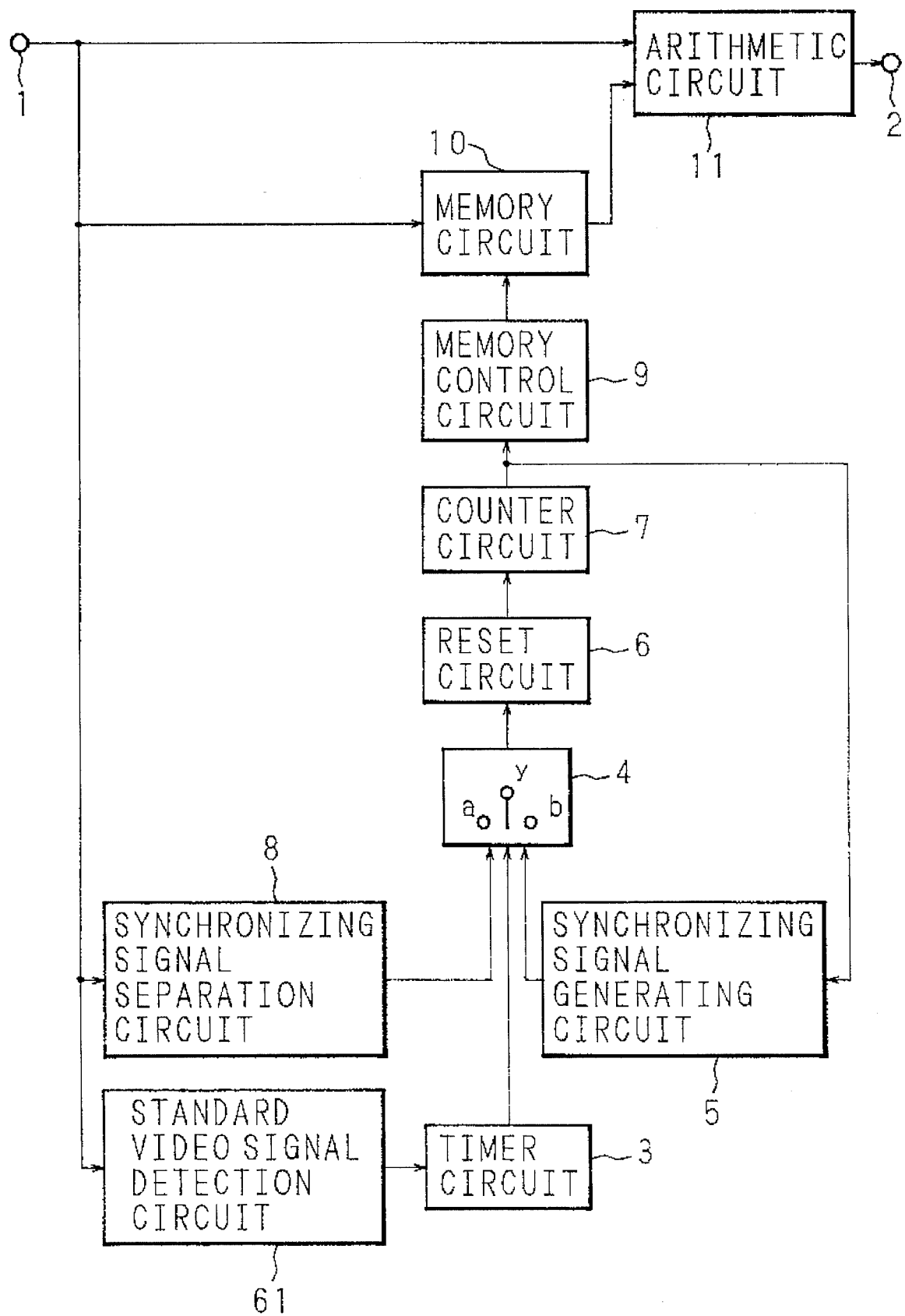
FIG. 12 is a diagram showing the configuration of a video signal processing apparatus according to a sixth embodiment.

FIG. 12 is a block diagram showing the configuration of a video signal processing apparatus according to a sixth embodiment of the invention. The configuration of the sixth embodiment shown in FIG. 12 is identical to that of the first embodiment shown in FIG. 6, except that a standard video signal detection circuit 61 for controlling the timer circuit 3 is added. Description of the construction and operation of the other parts, therefore, will not be repeated herein.

Consider the situation where, in the first embodiment, after the input terminal b has been connected to the output terminal y in the switch circuit 4 by the output signal from the timer circuit 3, the input video signal switches to a non-standard video signal, and then switches back to the standard video signal. At first, the operating cycle of the loop formed when the input terminal b is connected to the output terminal y in the switch circuit 4, that is, the cycle and phase of the synchronizing signal generating circuit 5, is synchronized with the input video signal, and the portion and position of the input video signal to be written into the memory circuit 10 is determined in accordance with the values preset by the memory control circuit 9.

However, when the input video signal has switched to a non-standard video signal, equations (1) and (2) are no longer satisfied, and as a result, the synchronizing signal outputted from the synchronizing signal generating circuit 5 is out of synchronization in cycle and phase with the input video signal. After that, when the input video signal has switched back to the standard video signal, synchronization in cycle is restored between the synchronizing signal outputted from the synchronizing signal generating circuit 5 and the input video signal, but as for the phase, synchronization is achieved with a different phase from the phase with which the synchronizing signal was synchronized before the input video signal switched to the non-standard video signal. As a result, the position of the input video signal written in the memory circuit 10 is different from that written before the input video signal switched to the non-standard video signal.

In the sixth embodiment, the standard video signal detection circuit 61 is provided to detect whether the input video signal is a standard signal or a non-standard signal, and using the result of the detection in the standard video signal detection circuit 61, the timer circuit 3 is controlled. When the input video signal has switched from the standard video signal to a non-standard video signal, the standard video signal detection circuit 61 supplies the resulting information to the timer circuit 3. Upon reception of this information, the timer circuit 3 is put in the initial state. That is, the input terminal a is connected to the output terminal y in the switch circuit 4, and the operation is performed to achieve phase synchronization between the input video signal and the synchronizing signal outputted from the synchronizing signal separation circuit 8. The operation after that is the same as in the first embodiment.

According to the above configuration, malfunctioning, such as variations in the write position of the input video signal, can be prevented even when the input video signal switches to a non-standard video signal and then switches back to the standard signal.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A video signal processing apparatus, comprising:

synchronizing signal separating means for separating a first synchronizing signal from a current input video signal;

synchronizing signal generating means for generating a second synchronizing signal; and means for obtaining a delayed input video signal based on the first synchronizing signal until the second synchronizing signal becomes synchronized with the first synchronizing signal, and then on the second synchronizing signal.

2. A video signal processing apparatus according to claim 1, further comprising:

arithmetic means for performing arithmetic operations between the current input video signal and the delayed input video signal.

3. A video signal processing apparatus, comprising:

synchronizing signal separating means for separating a first synchronizing signal from an input video signal;

synchronizing signal generating means for generating a second synchronizing signal; and selecting means for selecting and outputting one of the first synchronizing signal and the second synchronizing signal as a main synchronizing signal, the selecting means selecting and outputting the first synchronizing signal as the main synchronizing signal until the second synchronizing signal becomes synchronized with the first synchronizing signal, and then selecting and outputting the second synchronizing signal as the main synchronizing signal.

4. A video signal processing apparatus according to claim 3, wherein the synchronizing signal generating means generates the second synchronizing signal such that the second synchronizing signal has substantially a same cycle as the first synchronizing signal.

5. A video signal processing apparatus according to claim 3, further comprising:

timer means for measuring a predetermined period, the predetermined period being an amount of time for the second synchronizing signal to become synchronized with the first synchronizing signal; and wherein the selecting means selects and outputs the second synchronizing signal as soon as the timer means indicates expiration of the predetermined period.

6. A video signal processing apparatus according to claim 3, further comprising:

detecting means for detecting whether the input video signal is a standard video signal; and wherein the selecting means performs the selecting and outputting based on output of the detecting means.

7. A video signal processing apparatus according to claim 3, wherein the selecting means selects and outputs the first synchronizing signal as the main synchronizing signal when the detecting means detects a non-standard video signal.

8. A video signal processing apparatus, comprising:

storage means for storing an input video signal for a predetermined length of time;

arithmetic means for performing arithmetic operations between the input video signal and an output of the storage means;

synchronizing signal separating means for separating a first synchronizing signal from the input video signal;

synchronizing signal generating means for generating a second synchronizing signal; and control means for controlling the operation of said storage means based on the first synchronizing signal until the second synchronizing signal becomes synchronized with the first synchronizing signal, and then on the second synchronizing signal.

9. A video signal processing apparatus according to claim 8, further comprising:

extracting means for extracting, from the input video signal, video signal information necessary for the arithmetic operations performed by the arithmetic means, and for supplying the video signal information to the storage means.

10. A video signal processing apparatus according to claim 3, further comprising:

storage means for storing the input video signal for a predetermined length of time;

arithmetic means for performing arithmetic operations between the input video signal and an output of the storage means;

storage control means for controlling the storage means based on the main synchronization signal;

counter means for controlling the storage control means; and wherein the synchronizing signal generating means generates the second synchronizing signal based on an output of the counter means.

11. A video signal processing apparatus according to claim 10, wherein the counter means is a vertical-direction counter circuit suitable for counting operations in vertical directions of a television screen, the synchronizing signal separating means is a vertical synchronizing signal separation circuit for separating a first vertical synchronizing signal from the video signal, the synchronizing signal generating means is a vertical synchronizing signal generating circuit for generating a second vertical synchronizing signal, and the selecting means selects and outputs one of the first vertical synchronizing signal and the second vertical synchronizing signal as the main synchronizing signal.

12. A video signal processing apparatus according to claim 10, wherein the counter means is a horizontal-direction counter circuit suitable for counting operations in horizontal directions of a television screen, the synchronizing signal separating means is a horizontal synchronizing signal separation circuit for separating a first horizontal synchronizing signal from the video signal, the synchronizing signal generating means is a horizontal synchronizing signal generating circuit for generating a second horizontal synchronizing signal, and the selecting means selects and outputs one of the first horizontal synchronizing signal and the second horizontal synchronizing signal as the main synchronizing signal.

13. A video signal processing apparatus according to claim 12, further comprising:

a vertical-direction counter circuit suitable for counting operations in vertical directions of a television screen;

a vertical synchronizing signal separation circuit for separating a vertical synchronizing signal from the input video signal; and a vertical-direction reset circuit for generating a pulse to reset said vertical-direction counter circuit based on the vertical synchronizing signal; and wherein the storage control means controls the storage means based on both the main synchronizing signal and the vertical synchronizing signal.

14. A video signal processing apparatus according to claim 10, further comprising:

extracting means for extracting, from the input video signal, video signal information necessary for the arithmetic operations performed by the arithmetic means, and for supplying the video signal information to the storage means.

15. A video signal processing apparatus according to claim 10, further comprising:

resetting means for controlling the counter means based on the main synchronizing signal.

16. A video signal processing apparatus according to claim 15, wherein the counter means is a vertical-direction counter circuit suitable for counting operations in vertical directions of a television screen, the synchronizing signal separating means is a vertical synchronizing signal separation circuit for separating a first vertical synchronizing signal from the video signal, the synchronizing signal generating means is a vertical synchronizing signal generating circuit for generating a second vertical synchronizing signal, and the selecting means selects and outputs one of the first vertical synchronizing signal and the second vertical synchronizing signal as the main synchronizing signal.

17. A video signal processing apparatus according to claim 15, wherein the counter means is a horizontal-direction counter circuit suitable for counting operations in horizontal directions of a television screen, the synchronizing signal separating means is a horizontal synchronizing signal separation circuit for separating a first horizontal synchronizing signal from the video signal, the synchronizing signal generating means is a horizontal synchronizing signal generating circuit for generating a second horizontal synchronizing signal, and the selecting means selects and outputs one of the first horizontal synchronizing signal and the second horizontal synchronizing signal as the main synchronizing signal.

18. A video signal processing apparatus according to claim 17, further comprising:

a vertical-direction counter circuit suitable for counting operations in vertical directions of a television screen;

a vertical synchronizing signal separation circuit for separating a vertical synchronizing signal from the input video signal; and a vertical-direction reset circuit for generating a pulse to reset said vertical-direction counter circuit based on the vertical synchronizing signal; and wherein the storage control means controls the storage means based on both the main synchronizing signal and the vertical synchronizing signal.

19. A video signal processing apparatus according to claim 15, further comprising:

extracting means for extracting, from the input video signal, video signal information necessary for the arithmetic operations performed by the arithmetic means, and for supplying the video signal information to the storage means.

20. A video signal processing apparatus according to claim 15, further comprising:

timer means for measuring a predetermined period, the predetermined period being an amount of time for the second synchronizing signal to become synchronized with the first synchronizing signal; and wherein the selecting means selects and outputs the second synchronizing signal as soon as the timer means indicates expiration of the predetermined period.

21. A video signal processing method, comprising the steps of:

(a) separating a first synchronizing signal from an input video signal; and (b) generating a second synchronizing signal; and (c) selectively outputting one of the first synchronizing signal and the second synchronizing signal as a main synchronizing signal, the first synchronizing signal being selectively output as the main synchronizing signal until the second synchronizing signal becomes synchronized with the first synchronizing signal, and then selectively outputting the second synchronizing signal as the main synchronizing signal.

22. A video signal processing method according to claim 21, wherein the step (b) generates the second synchronizing signal such that the second synchronizing signal has substantially a same cycle as the first synchronizing signal.

23. A video signal processing method according to claim 21, further comprising:

(d) measuring a predetermined period, the predetermined period being an amount of time for the second synchronizing signal to become synchronized with the first synchronizing signal; and wherein the step (c) selects and outputs the second synchronizing signal as soon as the step (c) indicates expiration of the predetermined period.

24. A video signal processing method according to claim 21, further comprising:

(d) detecting whether the input video signal is a standard video signal; and wherein the step (c) selectively outputs one of the first and second synchronizing signals based on output of the step (d).

25. A video signal processing method according to claim 21, wherein the step (c) selectively outputs the first synchronizing signal as the main synchronizing signal when the step (d) detects a non-standard video signal.

26. A video signal processing method according to claim 21, further comprising:

(d) storing, in a storage means, the input video signal for a predetermined length of time;

(e) performing arithmetic operations between the input video signal and an output of the step (d);

(f) extracting, from the input video signal, video signal information necessary for the arithmetic operations performed in the step (e); and (g) supplying output of the step (f) to the storage means.

27. A video signal processing method, comprising the steps of:

separating a first synchronizing signal from a current input video signal;

generating a second synchronizing signal; and obtaining a delayed input video signal based on the first synchronizing signal until the second synchronizing signal becomes synchronized with the first synchronizing signal, and then on the second synchronizing signal.

28. A video signal recording/reproduction apparatus, comprising:

synchronizing signal separating means for separating a first synchronizing signal from a current video signal;

synchronizing signal generating means for generating a second synchronizing signal; and means for obtaining a delayed video signal based on the first synchronizing signal until the second synchronizing signal becomes synchronized with the first synchronizing signal, and then on the second synchronizing signal.

29. A video signal recording/reproduction apparatus, comprising:

storage means for storing a video signal for a predetermined length of time;

arithmetic means for performing arithmetic operations between the video signal and an output of the storage means;

synchronizing signal separating means for separating a first synchronizing signal from the video signal;

synchronizing signal generating means for generating a second synchronizing signal; and control means for controlling operation of the storage means based on the first synchronizing signal until the second synchronizing signal becomes synchronized with the first synchronizing signal, and then on the second synchronizing signal.

30. A video signal processing apparatus according to claim 4, further comprising:

means for detecting whether the input video signal is a standard video signal or a non-standard video signal, and controlling the timer means in accordance with the result of the detection.

* * * * *